(12) United States Patent
Bayyapu et al.

(10) Patent No.: US 7,895,115 B2
(45) Date of Patent: Feb. 22, 2011

(54) METHOD AND SYSTEM FOR IMPLEMENTING MULTIPLE AUCTIONS FOR A PRODUCT ON A SELLER'S E-COMMERCE SITE

(75) Inventors: Pavan Bayyapu, Sunnyvale, CA (US); Yan Cui, Sunnyvale, CA (US); Yue Fang, Sunnyvale, CA (US); Narendra Penagulur, Sunnyvale, CA (US); Lenin K Subramanian, Palo Alto, CA (US); Zhong Zhang, Los Altos, CA (US)

(73) Assignee: SAP AG, Walldorf (DE)

( * ) Notice: Subject to any disclaimer, the term of this patent is extended or adjusted under 35 U.S.C. 154(b) by 398 days.

(21) Appl. No.: 11/591,218

(22) Filed: Oct. 31, 2006

(65) Prior Publication Data

US 2007/0106596 A1  May 10, 2007

(51) Int. Cl.
    *G06Q 40/00* (2006.01)
(52) U.S. Cl. .......................................... 705/37
(58) Field of Classification Search .................... 705/37
     See application file for complete search history.

(56) References Cited

U.S. PATENT DOCUMENTS

| | | | |
|---|---|---|---|
| 5,101,353 A | 3/1992 | Lupien et al. |
| 5,774,553 A | 6/1998 | Rosen |
| 5,774,873 A | 6/1998 | Berent et al. |
| 5,835,896 A | 11/1998 | Fisher et al. |
| 5,890,138 A | 3/1999 | Godin et al. |
| 6,047,268 A | 4/2000 | Bartoli et al. |
| 6,058,416 A | 5/2000 | Mukherjee et al. |
| 6,076,074 A | 6/2000 | Cotton et al. |
| 6,266,652 B1 | 7/2001 | Godin et al. |
| 6,285,989 B1 | 9/2001 | Shoham |
| 6,304,858 B1 | 10/2001 | Mosler et al. |
| 6,370,547 B1 | 4/2002 | Eftink |
| 6,388,183 B1 | 5/2002 | Leh |
| 6,408,282 B1 | 6/2002 | Buist |
| 6,415,270 B1 | 7/2002 | Rackson et al. |
| 6,415,320 B1 | 7/2002 | Hess et al. |
| 6,442,258 B1 | 8/2002 | Mashinsky |
| 6,442,558 B1 | 8/2002 | Brown et al. |
| 6,510,216 B1 | 1/2003 | Burr et al. |

(Continued)

OTHER PUBLICATIONS

R. Preston McAfee, Daniel C. Quan, Daniel R. Vincent, "How to Set Minimum Acceptable Bids, with An Application to Real Estate Auctions," *The Journal of Industrial Economics*, vol. 50 No. 4, Dec. 2002, pp. 391-416. Retrieved via ProQuet.

(Continued)

*Primary Examiner*—Lindsay M. Maguire
(74) *Attorney, Agent, or Firm*—Kenyon & Kenyon LLP (57) ABSTRACT

An internal auction application may allow a seller to create a multiple auction for a plurality of products and allow a buyer to see and bid on the multiple auction as appropriate. The internal auction application may receive parameters for the multiple auction from the seller and an associated plurality of auctions may be determined for the multiple auction as a function of the parameters. The internal auction application may create and publish the multiple auction and the associated plurality of auctions on a seller's e-commerce site visible to the buyer. The multiple auction may be a serial multiple auction, a recurring multiple auction or a varied sublot multiple auction.

17 Claims, 8 Drawing Sheets

U.S. PATENT DOCUMENTS

| | | |
|---|---|---|
| 6,609,108 B1 | 8/2003 | Pulliam et al. |
| 6,745,350 B1 | 6/2004 | Cline et al. |
| 6,792,399 B1 | 9/2004 | Phillips et al. |
| 6,868,525 B1 | 3/2005 | Szabo |
| 6,871,190 B1 | 3/2005 | Seymour et al. |
| 6,971,105 B1 | 11/2005 | Weber et al. |
| 6,983,395 B2 | 1/2006 | Chen et al. |
| 7,047,210 B1 | 5/2006 | Srinivasan |
| 7,107,227 B1 | 9/2006 | Bezos et al. |
| 7,110,967 B1 | 9/2006 | Espenes et al. |
| 7,136,903 B1 | 11/2006 | Phillips et al. |
| 7,149,720 B2 | 12/2006 | Shepherd |
| 7,158,944 B1 | 1/2007 | Settle, III |
| 7,191,147 B2 | 3/2007 | Heene et al. |
| 7,209,895 B2 | 4/2007 | Kundtz et al. |
| 7,216,103 B2 | 5/2007 | Friedland et al. |
| 7,228,287 B1 | 6/2007 | Samson et al. |
| 7,237,717 B1 | 7/2007 | Rao et al. |
| 7,249,061 B1 | 7/2007 | Suzuki |
| 7,263,498 B1 | 8/2007 | Van Horn et al. |
| 7,289,967 B1 | 10/2007 | Brader-Araje et al. |
| 7,310,610 B2 | 12/2007 | Fujita et al. |
| 7,324,968 B2 | 1/2008 | Rotman et al. |
| 7,457,778 B2 | 11/2008 | Li et al. |
| 7,461,022 B1 | 12/2008 | Churchill et al. |
| 7,490,242 B2 | 2/2009 | Torres et al. |
| 7,493,280 B2 | 2/2009 | Guler et al. |
| 7,505,935 B2 | 3/2009 | Mendiola et al. |
| 7,552,081 B2 | 6/2009 | Dutta et al. |
| 7,627,500 B2 | 12/2009 | Zhang et al. |
| 2001/0029478 A1 | 10/2001 | Laster et al. |
| 2001/0037255 A1 | 11/2001 | Tambay et al. |
| 2001/0042041 A1 | 11/2001 | Moshal et al. |
| 2001/0044751 A1 | 11/2001 | Pugliese et al. |
| 2001/0049654 A1 | 12/2001 | Cecchetti et al. |
| 2001/0054021 A1 | 12/2001 | Kawakura et al. |
| 2002/0002500 A1 | 1/2002 | Takahashi |
| 2002/0032018 A1 | 3/2002 | Morton et al. |
| 2002/0032621 A1* | 3/2002 | Smith et al. ............ 705/27 |
| 2002/0046153 A1 | 4/2002 | Piggins |
| 2002/0049738 A1 | 4/2002 | Epstein |
| 2002/0062251 A1 | 5/2002 | Anandan et al. |
| 2002/0069157 A1 | 6/2002 | Jordan |
| 2002/0072999 A1 | 6/2002 | Andres et al. |
| 2002/0082974 A1 | 6/2002 | Berstis |
| 2002/0082977 A1 | 6/2002 | Hammond et al. |
| 2002/0087456 A1 | 7/2002 | Abeshouse et al. |
| 2002/0095357 A1 | 7/2002 | Hunter et al. |
| 2002/0095441 A1 | 7/2002 | Lakhani et al. |
| 2002/0099641 A1 | 7/2002 | Mills et al. |
| 2002/0107779 A1 | 8/2002 | Maltzman |
| 2002/0111874 A1 | 8/2002 | Al-Kazily |
| 2002/0111895 A1 | 8/2002 | Blair |
| 2002/0116215 A1 | 8/2002 | Lawrence et al. |
| 2002/0116281 A1 | 8/2002 | Costello et al. |
| 2002/0120552 A1 | 8/2002 | Grey et al. |
| 2002/0128913 A1 | 9/2002 | Ower |
| 2002/0138342 A1 | 9/2002 | Clark et al. |
| 2002/0138399 A1 | 9/2002 | Hayes et al. |
| 2002/0143909 A1 | 10/2002 | Botz et al. |
| 2002/0147655 A1 | 10/2002 | Say |
| 2002/0165817 A1* | 11/2002 | Rackson et al. ............ 705/37 |
| 2002/0178104 A1 | 11/2002 | Hausman |
| 2002/0178166 A1 | 11/2002 | Hsia |
| 2002/0188551 A1 | 12/2002 | Grove et al. |
| 2002/0194051 A1 | 12/2002 | Hall et al. |
| 2003/0036975 A1 | 2/2003 | Martin et al. |
| 2003/0051164 A1 | 3/2003 | Patton |
| 2003/0055668 A1 | 3/2003 | Saran et al. |
| 2003/0126150 A1 | 7/2003 | Chan |
| 2003/0154134 A1 | 8/2003 | Wang |
| 2003/0163831 A1 | 8/2003 | Gall et al. |
| 2003/0220867 A1 | 11/2003 | Goodwin et al. |
| 2004/0024731 A1 | 2/2004 | Cabrera et al. |
| 2004/0093525 A1 | 5/2004 | Larnen |
| 2004/0098333 A1 | 5/2004 | Meesseman |
| 2004/0117293 A1 | 6/2004 | Lammle et al. |
| 2004/0128224 A1 | 7/2004 | Dabney et al. |
| 2004/0158549 A1 | 8/2004 | Matena et al. |
| 2004/0220821 A1 | 11/2004 | Ericsson et al. |
| 2004/0250009 A1 | 12/2004 | Chen et al. |
| 2004/0267719 A1 | 12/2004 | Doherty et al. |
| 2005/0010483 A1 | 1/2005 | Ling |
| 2005/0018667 A1 | 1/2005 | Chandra et al. |
| 2005/0033648 A1 | 2/2005 | Jin et al. |
| 2005/0033683 A1 | 2/2005 | Sacco et al. |
| 2005/0080714 A1 | 4/2005 | McHale et al. |
| 2005/0097005 A1 | 5/2005 | Fargo |
| 2005/0114225 A1 | 5/2005 | Longman et al. |
| 2005/0114229 A1 | 5/2005 | Ackley et al. |
| 2005/0187859 A1* | 8/2005 | Growney et al. ............ 705/37 |
| 2005/0203824 A1 | 9/2005 | Freud et al. |
| 2005/0209904 A1 | 9/2005 | Hayashi |
| 2005/0262000 A1 | 11/2005 | Sato |
| 2005/0283425 A1 | 12/2005 | Grove et al. |
| 2005/0289042 A1* | 12/2005 | Friesen ............ 705/37 |
| 2006/0004648 A1 | 1/2006 | Singh et al. |
| 2006/0155637 A1 | 7/2006 | Hawkes et al. |
| 2006/0184443 A1 | 8/2006 | Erez et al. |
| 2007/0011082 A1 | 1/2007 | Lynch |
| 2007/0043647 A1 | 2/2007 | Bickford |
| 2007/0179879 A1 | 8/2007 | Pomeranz et al. |
| 2007/0203820 A1 | 8/2007 | Rashid |
| 2007/0214075 A1 | 9/2007 | Ablan |
| 2007/0239594 A1 | 10/2007 | Conwell |
| 2007/0299765 A1 | 12/2007 | Smith et al. |
| 2008/0294544 A1 | 11/2008 | Harrington et al. |
| 2009/0030813 A1 | 1/2009 | Wiesehuegel et al. |

OTHER PUBLICATIONS

Mestelman, S., Welland, D., "Experience and inventory management in double-auction markets," Journal of Economic Behavior and Organization, 26(1995) pp. 35-48.

Auctionwatch Buy Now Storefronts FAQ.pdf, 20010609.

Auction Wizard 2000 Tourinventory, 20021011.

How to Use-Auction Manager Pro-Inventory Management, 20010417.

Auctionwatch HOW TO USE auction manager pro 0611 112001 www.auctionwatch.comlhelplamprolamprohowo~v31_bach. htm(ll of 7) accessed Feb. 24, 2008.

www.auctionwatch.com. Dec. 4, 2001. Recovered from www. Archive.org on Feb. 1, 2008.

AuctionWatch Business Solution Services.pdf, 20010616.

Auction Watch Products.pdf, 20020802.

Overstock, Oct. 2004, http://web.archive.org/web/20040912-20041102re_/http://overstock.com.

Flaim, Denise, "The E-Shopper: Playing A Hardball Game on eBay," Newsday, Long Island, NY, Jun. 6, 2001, p. C07.

Spanbauer, Scott, "How to Make Cash on eBay: Your Auction ABSs," PC World, Jul. 2003, vol. 21, Iss. 7, p. 150.

Auction Tamer, Apr. 9, 2003, http://web.archive.org/web/20030409155905/http://www.auctiontamer.com/auctionlisting.htm.

D.5.2, Creation of high performance DG-related databases for Information Services, M. Nov. 21, 2003, accessible (but protected) at http://www.iset.uni-kassel.de/dispowerstatic/documents/de152.pdf.

Envision Software, Inc.: Auction Tamer-Seller Add-on/Auction Poster Pro Feature, http://auctiontamer.com/auctionlisting.htm. pp. 1-13.

Geldman, A., "Evaluating e-Bay Seller Software," http://www.auctionbytes.com/cab/abu/v204/m05/abu0119/s02, pp. 1-3.

"I Pivot delivers new internet traffic appliances that eliminate error messages and optimize performance of Web Portals and Heavily Trafficked Content Sites," Business Wire: May 10, 1999, p. 1.

Hoxmeier et al., "A framework for the sustainability of e-marketplaces", Business Porcess Management Journal, v10n3, pp. 277-290 (2004).

"Novantus CRM Software Propels Success of First Online Auction Bonding Program; Novantus Deploys CRM Platform for buySAFE in Record Time," Business Wire: New York: Feb. 23, 2004, p. 1.

* cited by examiner

| AuctionID | MAuctionID | Product Description | Start Time | Duration | Lot Size | Starting Price | Final Bid |
|---|---|---|---|---|---|---|---|
| 1 | 2 | 2.5 GHz laptop | 10/1/2005 9:00am | 7 days | 5 | $1,500.00 | $2,312 |
| 2 | 2 | 2.5 GHz laptop | 10/7/2005 9:00am | 7 days | 4 | $1,300.00 | n/a |
| 3 | 5 | optical mouse | 11/1/2005 10:00pm | 10 days | 10 | $15.00 | n/a |

| 1 | 2 | 2.5 GHz laptop | 10/1/2005 9:00am | 7 days | 5 | $1,500.00 | $2,312 |

FIG. 8b
810

METHOD AND SYSTEM FOR IMPLEMENTING MULTIPLE AUCTIONS FOR A PRODUCT ON A SELLER'S E-COMMERCE SITE

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND

Businesses traditionally look for effective ways in which to make their products available to potential buyers. In addition to sales through physical "brick and mortar" stores, innovative ways to sell products are often used especially to dispose of old or excess inventory. The advent of the Internet along with the accompanying revolution in computer and network technology has created new sales paradigms and allowed businesses to establish their own electronic commerce ("e-commerce") presence through the use of, for example, Internet Web sites. E-commerce sales have steadily grown and now account for a significant portion of business-to-consumer as well as business-to-business sales. Auctions make up a significant portion of e-commerce sales and have grown into an increasingly more important sales paradigm.

The improvement in network and computer capabilities along with the mass availability and development of the Internet facilitates these alternative methods of sales such as auctions. Network-based electronic auctions, such as for example those conducted over the Internet, may allow a seller considerable control over an auction and may increase auction participation. For example, a seller may want to publish multiple auctions for a product. The Internet and network-based computing provide the ability to aggregate large numbers of bidders for an auction in an easier and generally less costly manner than through traditional auctions. Though network-based auctions (e.g., Internet-based auctions) provide significant advantages, the reliance on third party auction providers has limited a seller's control of its auctions in a number of ways. This includes the use of rules as to the conformance of auction procedures and the loss of control over the format of the auction and bidding process.

Third party auction providers provide a large scale e-commerce community portal that brings together large numbers of buyers and sellers who gather to trade in goods and services. For example, third party auction providers have become online marketplaces providing a powerful platform for the sale of goods and services among a passionate community of individuals and businesses. Everyday, millions of items across thousands of categories are available for sale by auction and for a fixed price, enabling trade on a local, national, and international basis with customized Internet Web sites in markets around the world. These third party auction providers may provide auction services for the seller as well as access to a ready pool of potential buyers but in exchange they may require a seller to conform their auctioning processes and procedures. In addition, a third party auction provider typically takes a fee that may be fixed or proportional to the value of the auctioned goods and/or services. In both cases, the seller loses some degree of control over the auction process in exchange for using the third party auction service.

In addition to the limitations on auction procedures and processes imposed by a third party auction provider, a business may not be able to make maximum use of its business information in providing and generating auctions through a third party auction service. Businesses have typically kept their information, including information regarding their assets and inventory they wish to sell or auction off, in database systems that are part of their corporate information systems. Conventional systems provide limited linking between these business information management systems and online Web auction services. Therefore, manual involvement with the Web auction service is required for each auction or sales posting conducted. These problems may be overcome and the limitations of third party auction services avoided by providing auction services through a seller's own e-commerce site.

DETAILED DESCRIPTION

According to one embodiment of the present invention, a method and a system may be provided for a multiple auction for a plurality of products and allow a buyer to see and bid on the multiple auction as appropriate. The multiple auction may be provided on a seller's internal auction application and made available to the buyer over a seller's e-commerce site. The internal auction application may receive parameters for the multiple auction from the seller and an associated plurality of auctions may be determined for the multiple auction as a function of the parameters. The internal auction application may create and publish the multiple auction and the associated plurality of auctions on a seller's e-commerce site visible to the buyer. The multiple auction may be a serial multiple auction, a recurring multiple auction or a varied sublot multiple auction.

According to another embodiment of the present invention, a procedure may be provided to create a multiple auction for a plurality of products in an internal auction system using an internal auction application for a seller's e-commerce site. The procedure may include receiving parameters for the multiple auction, determining by the internal auction application a plurality of auctions for the plurality of products as a function of the parameters of the multiple auction, creating by the internal auction application the plurality of auctions for the plurality of products, and publishing the plurality of auctions on the seller's e-commerce site. Each auction may be associated with a set of auction details. The plurality of items may be identical. The parameters may be received from the seller. The set of auction details associated with each auction may include a product description, a start time, a duration, a lot size, a starting price, and a final bid. The multiple auction may be a serial multiple auction, where the plurality of products are broken down into a plurality of auctions that are run over different periods of time. Each auction may have a different lot size. Alternatively, the multiple auction may be a recurring multiple auction, where the plurality of products may be products that the seller expects in inventory at some point in the future. Each of the auctions may be configured so that none of the auctions overlap in time with the other auctions. Alternatively, the multiple auction may be a varied sublot multiple auction, where a winning combination of auctions may be selected from a plurality of combinations of auctions, each combination with a total lot size equal to a desired quantity. The desired quantity may be received as a parameter for the multiple auction. A winning combination may be a combination where the total final bid is greater than the total final bid of any other combination.

According to another embodiment of the present invention, a system may be provided for creating a multiple auction for a plurality of products. The system may include a seller's e-commerce site and an internal auction system configured to interface with the seller's e-commerce site. The internal auction system may be configured to receive parameters for the multiple auction, determine a plurality of auctions for the plurality of products as a function of the parameters of the multiple auction, create the plurality of auctions for the plurality of products, and publish the plurality of auctions on the seller's e-commerce site. Each auction may be associated with a set of auction details. The set of auction details associated with each auction may include a product description, a start time, a duration, a lot size, a starting price, and a final bid. The multiple auction may be a serial multiple auction, where the plurality of products are broken down into a plurality of auctions that are run over different periods of time. Each auction may have a different lot size. Alternatively, the multiple auction may be a recurring multiple auction, where the plurality of products may be products that the seller expects in inventory at some point in the future. Each of the auctions may be configured so that none of the auctions overlap in time with the other auctions. Alternatively, the multiple auction may be a varied sublot multiple auction, where a winning combination of auctions may be selected from a plurality of combinations of auctions, each combination with a total lot size equal to a desired quantity. The desired quantity may be received as a parameter for the multiple auction. A winning combination may be a combination where the total final bid is greater than the total final bid of any other combination.

According to another embodiment of the present invention, a computer-readable medium may be provided. The computer-readable medium may include instructions adapted to execute a procedure for creating a multiple auction for a plurality of products in an internal auction system using an internal auction application for a seller's e-commerce site. The procedure may include receiving parameters for the multiple auction, determining by the internal auction application a plurality of auctions for the plurality of products as a function of the parameters of the multiple auction, creating by the internal auction application the plurality of auctions for the plurality of products, and publishing the plurality of auctions on the seller's e-commerce site. Each auction may be associated with a set of auction details.

Figure 1:
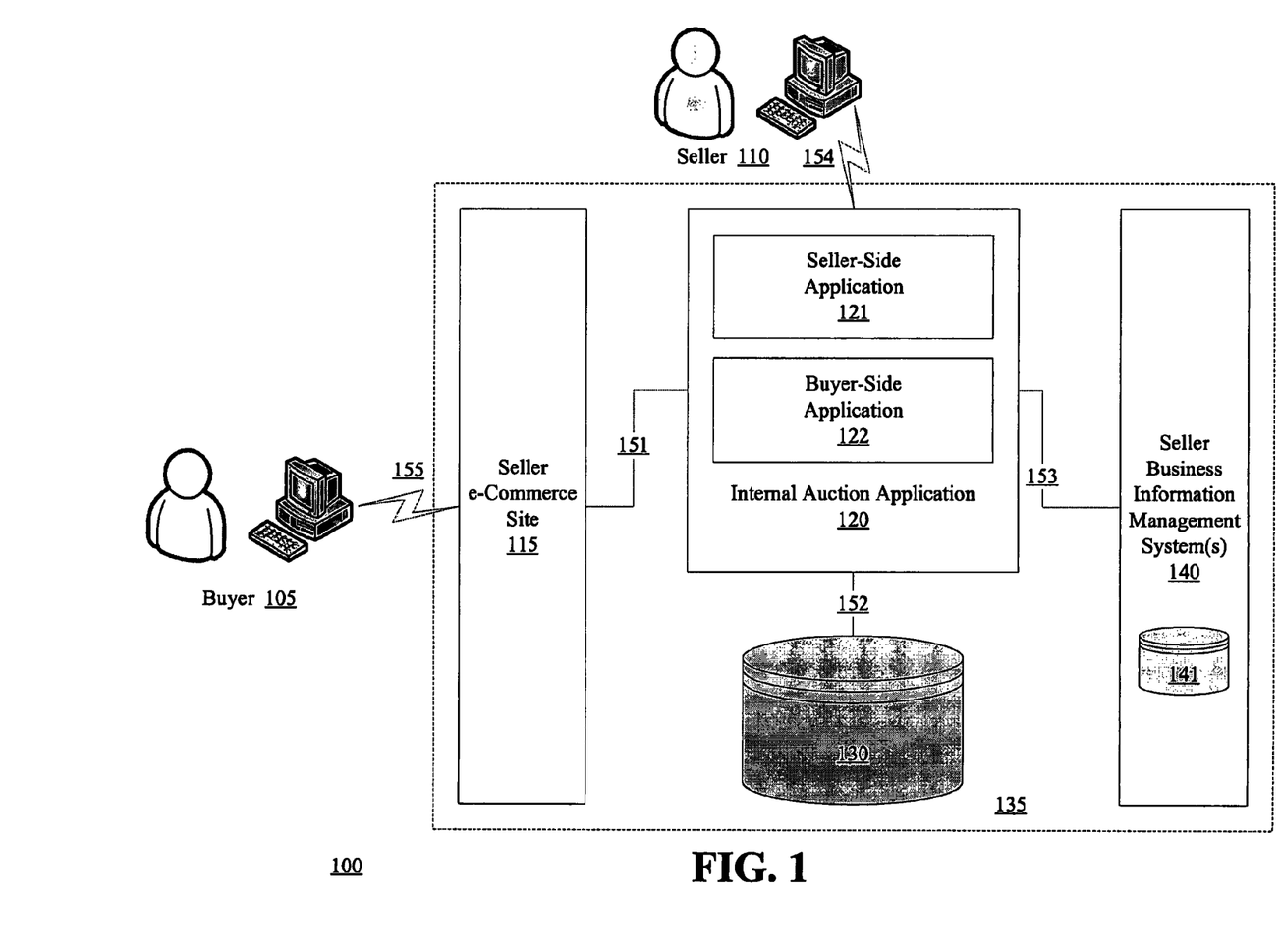
FIG. 1 illustrates an example integrated internal auction system, in accordance with an embodiment of the present invention.

FIG. 1 illustrates an example integrated internal auction system according to one embodiment of the present invention. A seller 110 may create an auction using an internal auction application 120 residing on the seller's information technology hardware environment 135. For example, the internal auction application 120 may include one or more software applications, programs, modules, procedures, or other computer code to include firmware and may additionally include data that resides on one or more servers, computers, or other hardware platforms that make up the seller's information technology hardware environment 135. The internal auction application 120 may be contain a seller-side application 121 handling the seller interaction 154 with the integrated internal auction system 100 through the internal auction application 120. The seller-side application 121 may include features to allow the seller 110 to create, monitor, and manage one or more auctions. The internal auction application 120 may also be conceptualized as containing a buyer-side application 122 handling the buyer interaction 155 with the integrated internal auction system 100 allowing buyer interaction 155 with the internal auction application 120 and the seller's business information management system(s) 140 through a seller's e-commerce site 115. The buyer-side application 122 may provide the functionality allowing the buyer 105 to view auctions, participate in active auctions, monitor auctions, and perform the checkout process on won auctions. Though conceptually the functionality provided by the seller-side application 121 and the buyer-side application 122 of the internal auction application 120 are different, both may share data sets, procedures, libraries, and other elements of software code or data. In one embodiment of the present invention, all the elements of the internal auction application 120 may either be contained in both the conceptual subsets—seller-side application 121 and buyer-side application 122—or in an alternative embodiment the internal auction application 120 may contain additional elements of software code and/or data in addition to these conceptual subsets 121, 122. The internal auction application 120 uses data that may be contained in a seller's business information management system(s) 140 and/or may be stored in a local database 130 for the internal auction application 120. This local database 130 may be considered part of the internal auction application 120 in this embodiment of the present invention even if the database is stored separately in a memory system.

An internal auction application 120 may communicate 152 with the local database 130; communicate 153 with the seller's business information management system(s) 140; and communicate 151 with the seller's e-commerce site 115 using a communication network that is part of the seller's information technology hardware environment 135. For example, the seller's e-commerce site 115, internal auction application 120, local database 130, and business information management system(s) 140 may be located on servers or other computers that are part of a communication network—such as a local area network (LAN) or wide area network (WAN)— controlled by the seller. In an alternative embodiment, the seller's information technology hardware environment 135 may include a communication network that is shared by the seller with other network users. For example, the seller's e-commerce site 115, internal auction application 120, local database 130, and business information management system(s) 140 may be located on servers or other computers that are part of at least one internal seller communication network (e.g., a LAN and/or WAN) as well as a shared (i.e., shared by seller with other non-seller related entities) communication network such as the Internet. In either embodiment regardless of the network used for communication between the elements of the integrated auction system 100, seller communication 154 and buyer communication 155 with the integrated auction system 100 may occur over an external network (i.e., a network external to the seller and not under the seller's direct control), such as for example, the Internet. In an alternative embodiment, seller and buyer communication 154, 155 with the integrated auction application 100 may occur over a seller-controlled network (such as a seller-controlled wide area sales network) and/or may involve a combination of at least one seller-controlled network and at least one external network.

The integrated auction system 100 integrates a seller's business information management systems(s) 140, which serves as a backend system(s), with a seller's e-commerce site 115, serving as a front-end system, using an internal auction application 120 in order to provide auction services to the seller 110 and the buyer 105 according to one embodiment of the present invention. A seller business information management system 140 is a an application with at least one associated database 141 typically using a database management system (DBMS) that provides data storage and associated programming support for that data (e.g., a query system such as an SQL (Structured Query Language) editor, optimization routines, program interfaces). For example, a seller may have an inventory control system 140 with its own inventory database 141 developed on a business information management system 140. The business information management system(s) 140 may contain product information and availability information used in generating an auction and performing order generation to fulfill a winning bidder's order according to one embodiment of the present invention. The seller's e-commerce site 110 allows a buyer 105 to participate in an auction over a communication network. For example, a seller Web site on the Internet offering goods and/or services (electronic commerce) is one example of a seller e-commerce site 115. An auction in the integrated auction system 100 is made available to the buyer 105 through the seller e-commerce site 115 which may serve as the buyer portal to the integrated auction system 100 according to one embodiment of the present invention. The seller 110 creates and manages auctions through the internal auction application 120 which integrates 153 information from the business information management system(s) 140 and provides the interaction processing 151 with the buyer 105 through the seller e-commerce site 115.

Figure 2:
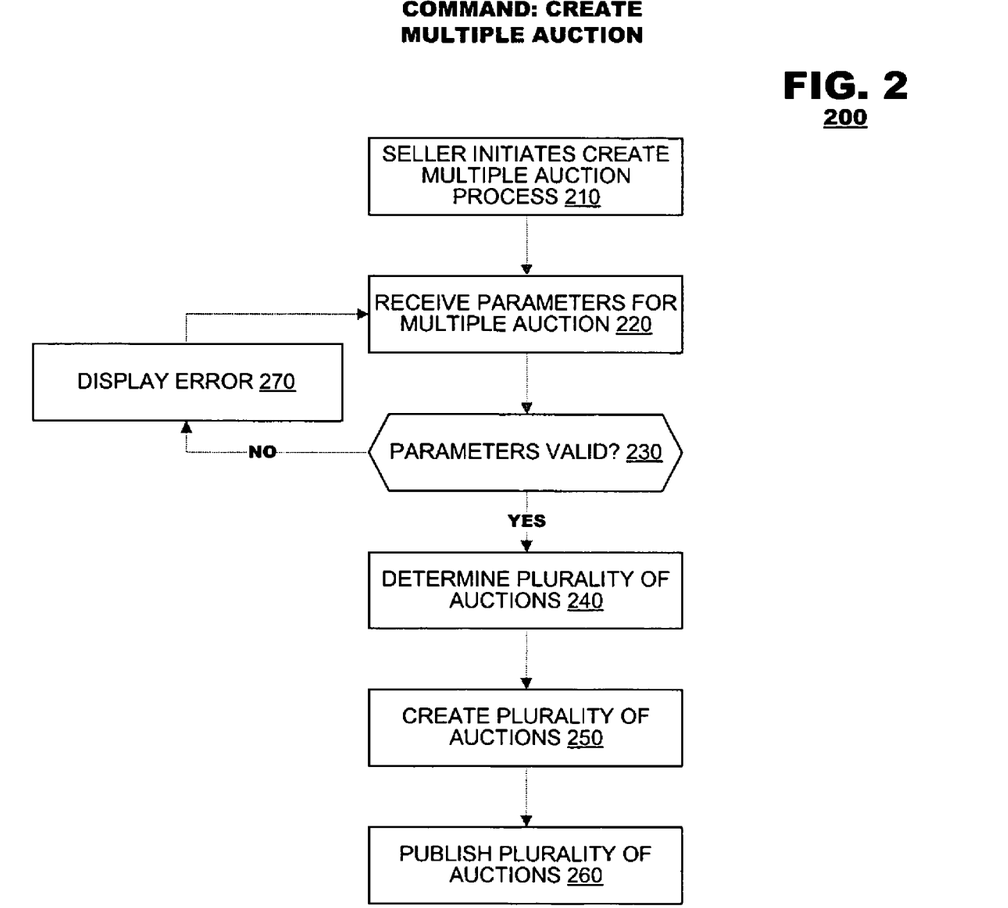
FIG. 2 illustrates an example procedure for creating a multiple auction, in accordance with an embodiment of the present invention.

FIG. 2 illustrates an example procedure for creating a multiple auction, in accordance with an embodiment of the present invention. The example procedure may be configured to execute on an internal auction application 120 as depicted in FIG. 1. In 210, a seller may initiate a "create multiple auction" process. For example, the seller 110 as depicted in FIG. 1 may utilize a terminal to interact with the internal auction application. The terminal may be, for example, a personal computer, a laptop, a wireless device or other device. For example, the terminal may be configured to execute an Internet browser, such as Internet Explorer, Firefox, or Netscape Communicator. The seller may initiate a "create multiple auction" command on the Internet browser by conventionally selecting a provided hyperlink or button.

In 220, the internal auction application may receive a set of parameters for a multiple auction. The set of parameters may include a plurality of pieces of data. Each piece of data may be, for example, a number, a string, or any other data type. For example, the set of parameters may be received from the seller. Alternatively, the set of parameters may be set by the internal auction application by default. If a default set of parameters is used, the internal auction application may be configured to only use a default parameter if the corresponding parameter was not received from the seller.

In 230, the internal auction application may test whether the set of parameters received are valid. The set of parameters may be compared with a set of rules programmed into the internal auction application. For example, each piece of data in the set of parameters may be checked to ensure it is of a correct data type. In addition, each piece of data may be checked to be in a given range. If the set of parameters are valid, the procedure proceeds to 240. If the set of parameters are invalid, the procedure proceeds to 270.

Figure 3:
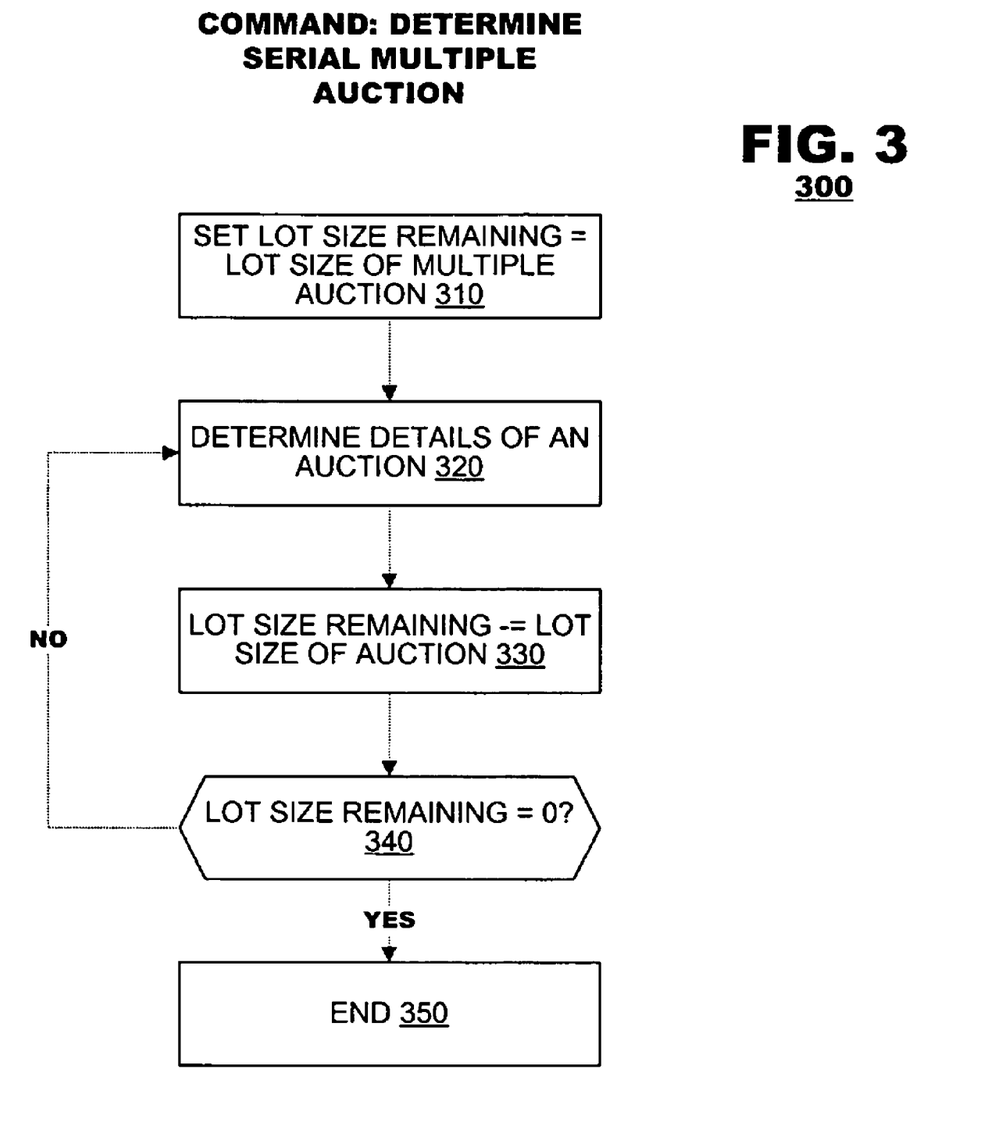
FIG. 3 illustrates an example procedure for determining a serial multiple auction, in accordance with an embodiment of the present invention.
Figure 4:
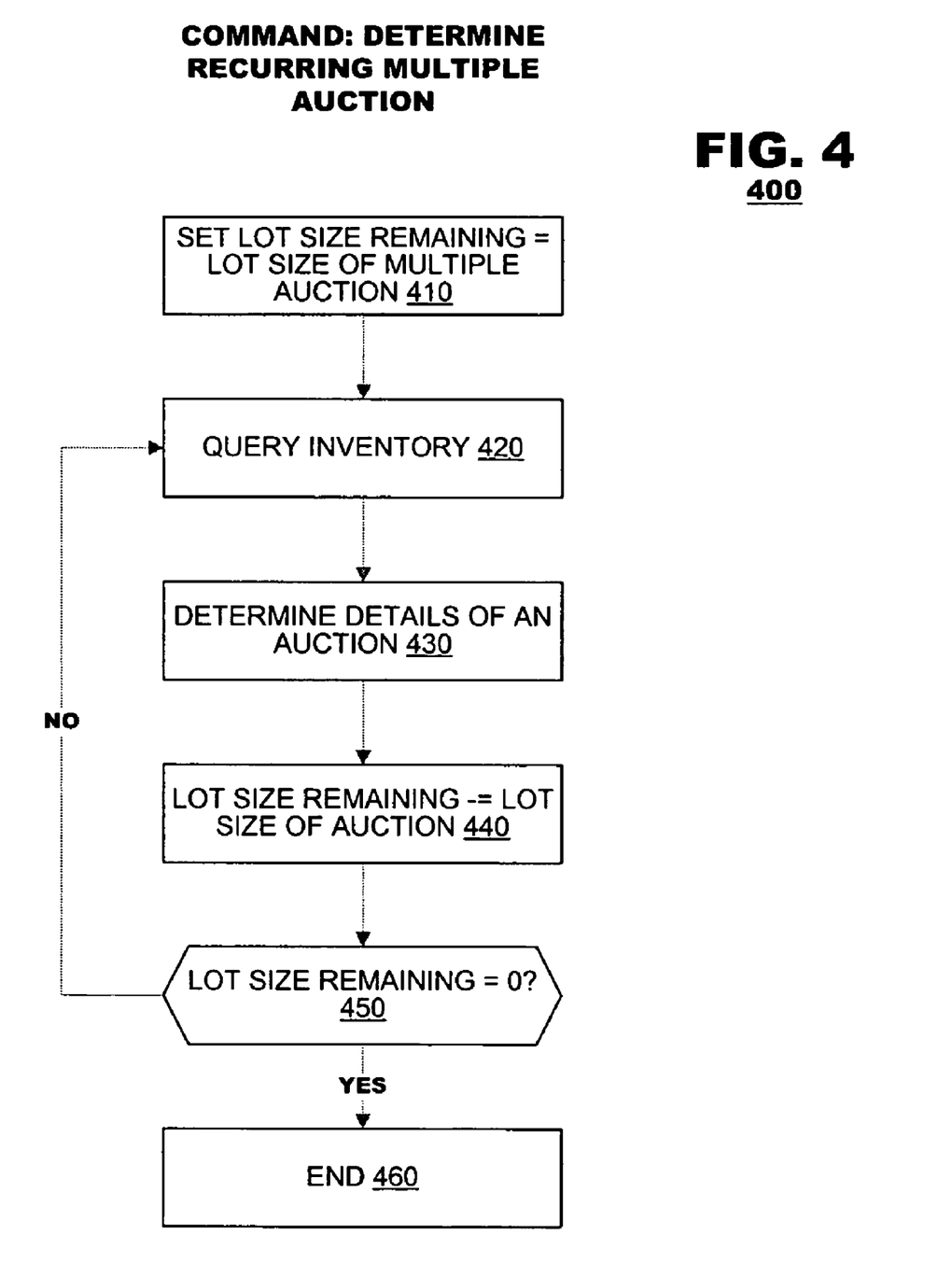
FIG. 4 illustrates an example procedure for determining a recurring multiple auction, in accordance with an embodiment of the present invention.
Figure 5:
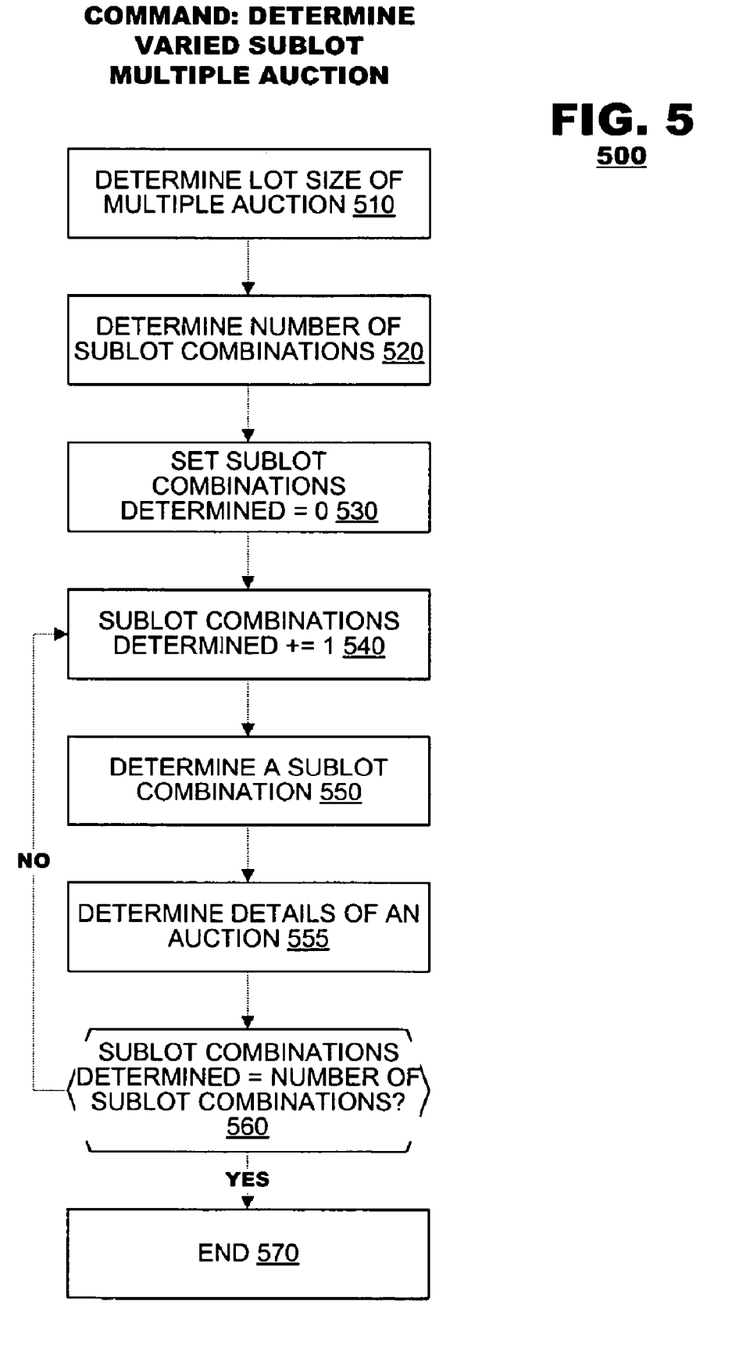
FIG. 5 illustrates an example procedure for determining a varied sublot multiple auction, in accordance with an embodiment of the present invention.

In 240, the internal auction application may determine a plurality of auctions. For example, the plurality of auctions may be determined by an example procedure as depicted in FIGS. 3, 4 or 5. For example, the plurality of auctions may reflect a serial multiple auction (depicted in FIG. 3), a recurring multiple auction (depicted in FIG. 4) or a varied sublot multiple auction (depicted in FIG. 5).

Figures 7A, 7B:
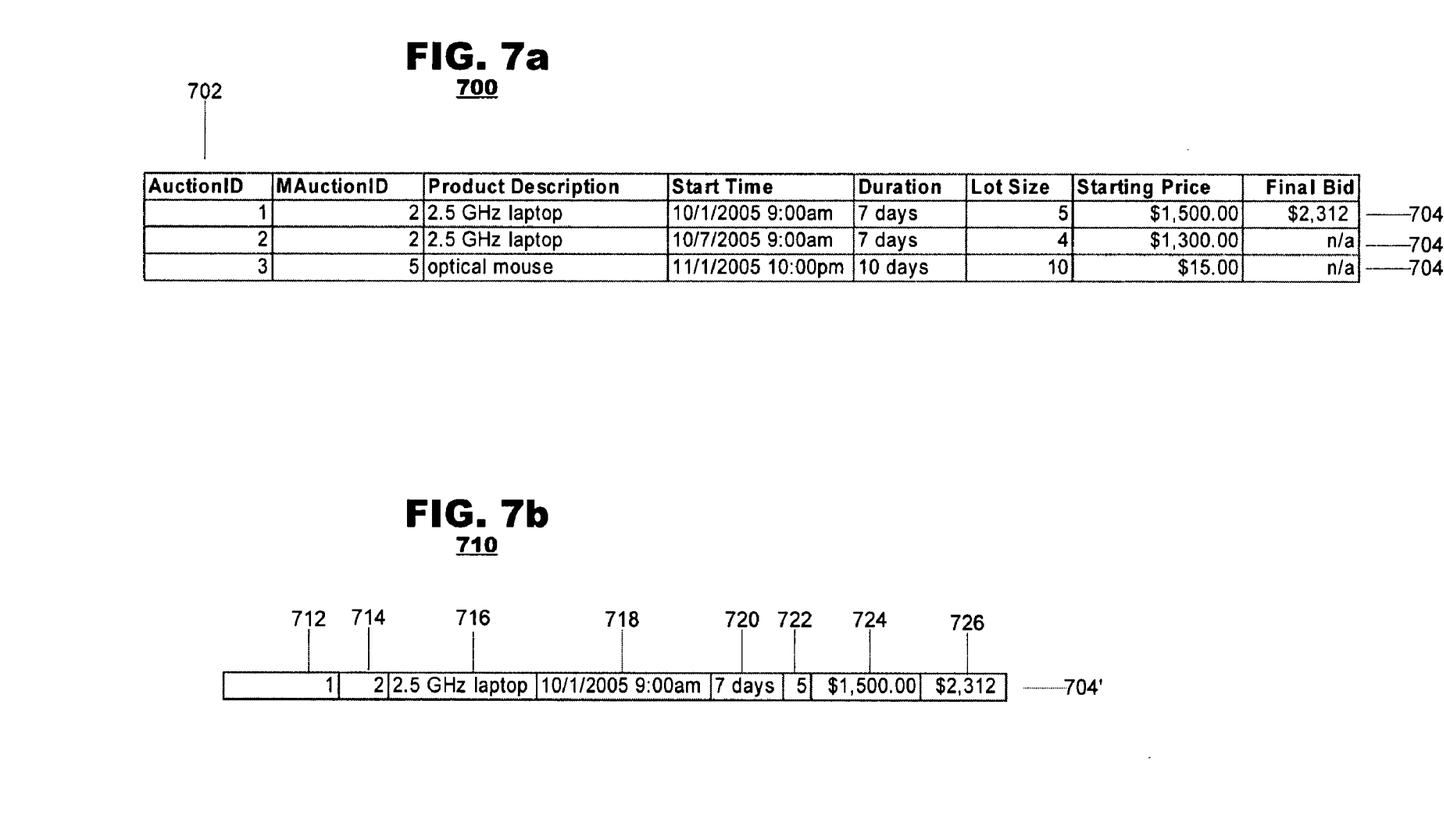
FIG. 7a illustrates an example auction properties table, in accordance with an embodiment of the present invention.
FIG. 7b illustrates an example auction properties table entry, in accordance with an embodiment of the present invention.
Figure 8A:
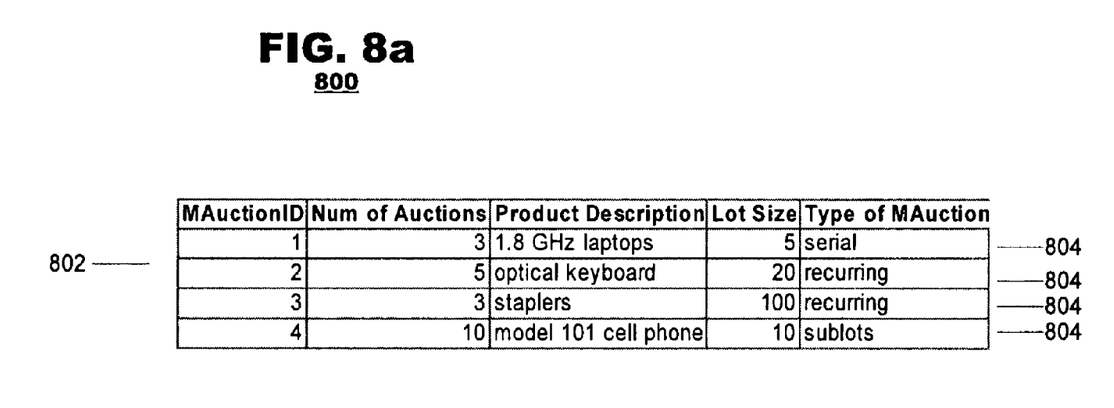
FIG. 8a illustrates an example multiple auction properties table, in accordance with an embodiment of the present invention.

In 250, the internal auction application may create the plurality of auctions as determined in 240. For example, the plurality of auctions may be created by the seller-side application 121 in interaction with the seller business information management system 140 depicted in FIG. 1. An entry may be added to a multiple auction properties table, as depicted in FIG. 8*a*. The entry may include the parameters of the multiple auction. A plurality of entries may be added to an auction properties table, as depicted in FIG. 7*a*. Each of the entries in the auction properties table may include details of each auction.

In 260, the internal auction application may publish the plurality of auctions as determined in 240. For example, the plurality of auctions may be published to the seller e-commerce site 115 where it may be available to a buyer 105 as depicted in FIG. 1.

In 270, the internal auction application may display an error message to the seller. The error message may indicate an error with the set of parameters and suggest corrections. For example, the error message may be communicated to the seller on the terminal used by the seller. The procedure then proceeds to 220.

FIG. 3 illustrates an example procedure for determining a serial multiple auction, in accordance with an embodiment of the present invention. In 310, a variable representing a lot size remaining may be set to equal the lot size of the multiple auction. For example, the variable may be of an integer data type. The lot size of the multiple auction may be one piece of data included in the set of parameters received in 220 as depicted in FIG. 2.

In 320, details of an auction may be determined. For example, details of an auction may include the fields of the auction properties table, as depicted in FIG. 7*a*. The details of an auction may be part of the parameters of the multiple auction, user-input variables or system/user determined defaults. The details of the auction may include a lot size of the auction. For example, the serial multiple auction may include a plurality of auctions for a plurality of products, where all the products are identical. The plurality of auctions may be for the same lot size of the products but scheduled over different times to avoid saturating the market. Thus, the start time of a second auction may be later than the start time plus the duration of a first auction. For example, a serial multiple auction of 100 laptop computers may include five auctions for 20 laptop computers each. The start time and duration of each auction may be determined so there is no overlap in time of the five auctions. For example, the duration of each auction may be 7 days, and the start times of the auctions are staggered by 7 days. At any given time, only one auction may be active.

In 330, the variable representing the lot size remaining may be decremented by a lot size of the auction determined in 320.

In 340, the procedure may test whether the variable representing the lot size remaining equals zero. If yes, all auctions have been determined and the procedure may proceed to 350. If no, auctions remain to be determined and the procedure may proceed to 320.

In 350, the procedure may end. A plurality of auctions may have been determined by 320, where a sum of the lot sizes of the plurality of auctions equals the lot size of the multiple auction.

FIG. 4 illustrates an example procedure for determining a recurring multiple auction, in accordance with an embodiment of the present invention. In 410, a variable representing a lot size remaining may be set to equal the lot size of the multiple auction. For example, the variable may be of an integer data type. The lot size of the multiple auction may be one piece of data included in the set of parameters received in 220 as depicted in FIG. 2.

In 420, an inventory system may be queried. For example, the inventory system may be part of the seller business information management system 140 depicted in FIG. 1. The inventory system may be a database containing the seller's current and projected inventory levels. The inventory system may be queried to determine a current and projected inventory levels of the product of the recurring multiple auction.

In 430, details of an auction may be determined. For example, details of an auction may include the fields of the auction properties table, as depicted in FIG. 7a. The details of an auction may be part of the parameters of the multiple auction, user-input variables or system/user determined defaults. The details of the auction may include a lot size of the auction. For example, the recurring multiple auction may include a plurality of auctions for a plurality of products, where all the products are identical. The plurality of auctions may be for the same lot size of the products but scheduled over different times as the products are received in the seller's inventory. Thus, the start time of each auction must be equal to or later than the expected receipt time in the seller's inventory. For example, a recurring multiple auction of 100 laptop computers may include five auctions for 20 laptop computers each, where the seller expects to receive 20 laptop computers once a week for 5 weeks. The start time of the 5 auctions may be a Monday of every week for 5 weeks.

In 440, the variable representing the lot size remaining may be decremented by a lot size of the auction determined in 430.

In 450, the procedure may test whether the variable representing the lot size remaining may be equals zero. If yes, all auctions have been determined and the procedure may proceed to 460. If no, auctions remain to be determined and the procedure may proceed to 420.

In 460, the procedure may end. A plurality of auctions may have been determined by 430, where a sum of the lot sizes of the plurality of auctions equals the lot size of the multiple auction.

FIG. 5 illustrates an example procedure for determining a varied sublot multiple auction, in accordance with an embodiment of the present invention. In 510, a variable representing a lot size remaining may be set to equal the lot size of the multiple auction. For example, the variable may be of an integer data type. The lot size of the multiple auction may be one piece of data included in the set of parameters received in 220 as depicted in FIG. 2. Alternatively, the lot size of the multiple auction may be a system/user programmed default value or responsively determined based on programmed rules.

In 520, a number of sublot combinations may be determined. For example, the number of sublot combinations may be one piece of data included in the set of parameters received in 220 as depicted in FIG. 2. Alternatively, the number of sublot combinations may be a system/user programmed default value or responsively determined based on programmed rules.

In 530, a variable representing a number of sublot combinations already determined may be set to equal zero. For example, the variable may be of an integer data type.

In 540, the variable representing the number of sublot combinations already determined may be incremented by 1.

In 550, a sublot combination may be determined. For example, a sum of lot sizes associated with each auction of a sublot combination may be equal to the lot size of the multiple auction. For example, the lot sizes associated with each auction of a sublot combination may be identical.

In 555, the details of each auction in the sublot combination may be determined. For example, details of an auction may include the fields of the auction properties table, as depicted in FIG. 7a. The details of an auction may be part of the parameters of the multiple auction, user-input variables or system/user determined defaults. For example, the varied sublot multiple auction may include a plurality of auctions for a plurality of products, where all the products are identical.

For example, a varied sublot multiple auction of 100 laptop computers may include 1 auction for all 100 laptop computers, 2 auctions for 50 laptop computers each, 5 auctions for 20 laptop computers each, and 10 auctions for 10 laptop computers each. A final combination of bids with a maximum total amount may be chosen to be the winning combination. For example, the final winning combination may be one of the two 50 laptop auctions, two of the 20 laptop auctions and one of the 10 laptop auctions. The winning combination may maximize a seller's revenue for auctioning 100 laptop computers.

In 560, the procedure may test whether the variable representing the number of sublot combinations already determined is equal to the number of sublot combinations. If yes, all auctions of all sublots have been determined and the procedure may proceed to 570. If no, auctions remain to be determined and the procedure may proceed to 540.

In 570, the procedure may end. A plurality of auctions may have been determined by 555.

Figure 6:
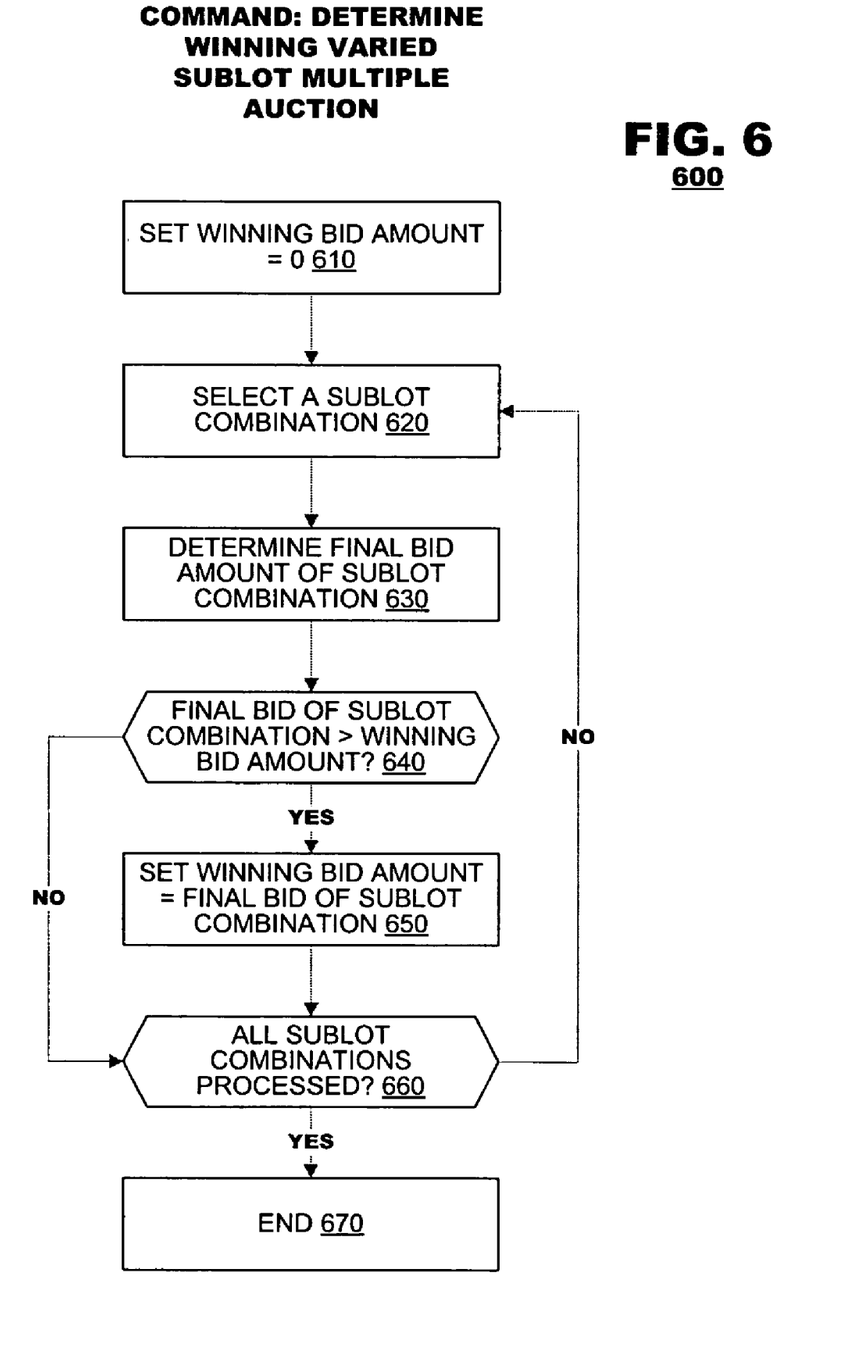
FIG. 6 illustrates an example procedure for determining a winning varied sublot combination and a winning bid amount, in accordance with an embodiment of the present invention.

FIG. 6 illustrates an example procedure for determining a winning varied sublot combination and a winning bid amount, in accordance with an embodiment of the present invention. In 610, a variable representing a winning bid may be set to equal zero. For example, the variable may be of an integer data type. A variable representing a winning combination may also be set to equal zero. For example, the variable representing the winning combination may be an array.

In 620, a sublot combination selected. For example, the sublot combination may be one of the sublot combinations determined in 550 of FIG. 5.

In 630, a final bid amount of the sublot combination may be determined. For example, the final bid amount may be set equal to a sum of the final bids associated with the auctions in the sublot combination.

In 640, the procedure may test if the final bid amount of the sublot combination is greater than the winning bid. If yes, the sublot combination may be the winning combination and the procedure proceeds to 650. If no, the procedure proceeds to 660.

In 650, the variable representing the winning bid may be set to equal the final bid amount of the sublot combination. The variable representing the winning combination may be set to equal the sublot combination.

In 660, the procedure may test if all sublot combinations have been processed. If yes, the procedure may proceed to 670. If no, the procedure may proceed to 620.

In 670, the procedure may end. A winning bid and combination may have been determined by 650.

FIG. 7a illustrates an example auction properties table, in accordance with an embodiment of the present invention. The auction properties table 702 may include a plurality of records 704, each record 704 representing one auction in the integrated internal auction system as depicted in FIG. 1.

It will be appreciated that the auction properties table 702 may be stored in a variety of ways accessible to a server. For example, it may be stored as a tab delimited or comma delimited flat file, in a relational database or another storage method accessible to a server.

FIG. 7b illustrates an example auction properties table entry, in accordance with an embodiment of the present invention. Each auction properties table entry may be a record 704' and may represent one auction. Each record 704' may contain a variety of information, such as an AuctionID 712. For example, AuctionID 712 may be an identifier associated with each record 704'. The AuctionID 712 may be a unique identifier comprising a string of alpha-numeric characters. For example, the record 704' indicates the AuctionID is 1.

Figure 8B:
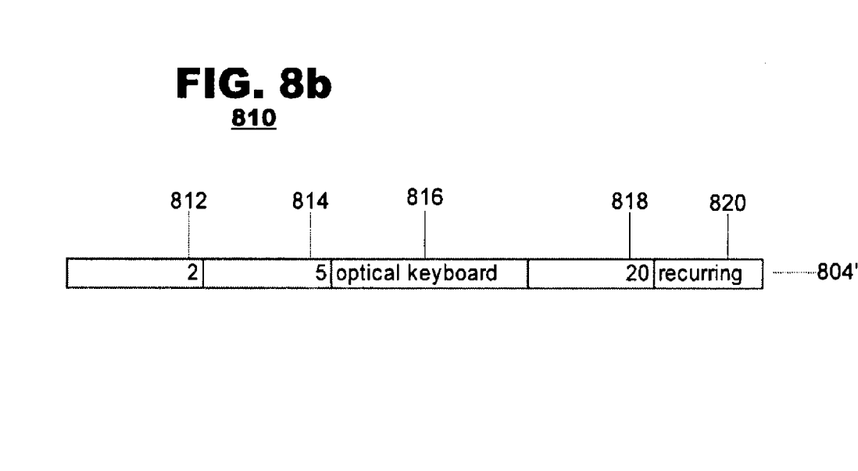
FIG. 8b illustrates an example multiple auction properties table entry, in accordance with an embodiment of the present invention.

The record 704' may also include a MAuctionID 714. The MAuctionID 714 may be an identifier associated with a multiple auction. For example, the MAuctionID 714 may refer to a record in a multiple auction properties table as depicted in FIGS. 8a and 8b. MAuctionID may be a unique identifier comprising a string of alpha-numeric characters. For example, the record 704' indicates the MAuctionID is 2.

The record 704' may also include a Product Description 716. The Product Description 716 may be a string variable containing a description of the product on auction. Alternatively, the Product Description 716 may be an identifier representing a description of the product on auction. For example, the record 704' indicates the Product Description is "2.5 GHz laptop."

The record 704' may also include a Start Time 718. The Start Time 718 may be a field representing a date and time when the auction will begin. For example, the record 704' indicates that the auction will begin on Oct. 1, 2005 at 9:00am. Alternatively, the Start Time 718 may be a field representing an auction starting date and time in another conventional format.

The record 704' may also include a Duration 720. The Duration 720 may be a field representing the length of time the auction will last. For example, the Duration 720 may be a period of time, such as minutes, hours, days, weeks, or months. For example, the record 704' indicates that the auction will last for 7 days.

The record 704' may also include a Lot Size 722. For example, the Lot Size 722 may indicate a lot size or quantity of products included in the auction. For example, the record 704' indicates that the auction is offering a lot size of 5.

The record 704' may also include a Starting Price 724. For example, the Starting Price 724 may indicate the beginning bid of the auction. For example, the record 704' indicates that the starting price is $1,500.

The record 704' may also include a Final Bid 726. For example, the Final Bid 726 may represent a winning bid of the auction. In this example, the Final Bid 726 may be assigned a value of zero or "not applicable" until the auction ends and a final bid has been determined. For example, the record 704' indicates that the final bid is $2,312.

FIG. 8a illustrates an example multiple auction properties table, in accordance with an embodiment of the present invention. The multiple auction properties table 802 may include a plurality of records 804, each record 804 representing one multiple auction in the integrated internal auction system as depicted in FIG. 1.

It will be appreciated that the multiple auction properties table 802 may be stored in a variety of ways accessible to a server. For example, it may be stored as a tab delimited or comma delimited flat file, in a relational database or another storage method accessible to a server.

FIG. 8b illustrates an example multiple auction properties table entry, in accordance with an embodiment of the present invention. Each multiple auction properties table entry may be a record 804'. Each record 804' may represent a multiple auction in the internal auction application. Each record 804' may contain a variety of information, such as a MAuctionID 812. For example, MAuctionID 812 may be an identifier associated with each record 804'. The MAuctionID 812 may be a unique identifier comprising a string of alpha-numeric characters. For example, the record 804' indicates the MAuctionID is 2.

The record 804' may also include a Number of Auctions 814. The Number of Auctions 814 may be an integer representing a number of auctions associated with the multiple auction. For example, the record 804' indicates that there are 5 auctions associated with the multiple auction.

The record 804' may also include a Product Description 816. The Product Description 816 may be a string representing a description of the product on auction. Alternatively, the Product Description 816 may be an identifier representing a description of the product on auction. For example, the record 804' indicates the Product Description is "optical keyboard."

The record 804' may also include a Lot Size 818. For example, the Lot Size 818 may indicate a lot size or quantity of products included in the multiple auction. For example, the record 804' indicates that the auction is offering a lot size of 20.

The record 804' may also include a Type of Multiple Auction 820. The Type of Multiple Auction 820 may be a field representing the type of multiple auction. For example, the multiple auction may be a serial, recurring, or sublot multiple auction. A serial multiple auction may include a plurality of auctions with non-overlapping start times and durations. A recurring multiple auction may be a plurality of identical auctions that recur periodically. A sublot multiple auction may break a lot size down into sublots and combine various bids on the sublots into one winning combination of sublot bids that maximizes auction revenues.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer-implemented method for auctioning a number of products, comprising:

subdividing, by a processor, the number of products into a plurality of first and second sublots, a total quantity of the products in the plurality of first sublots equaling the number of products and a total quantity of the products in the plurality of second sublots equaling the number of products;

creating, by the processor, auctions for each sublot in the first and second sublots;

calculating, by the processor, total final bid values of a plurality of combinations of the auctions, each auction combination having a total of quantity of products equaling the number of products and at least one auction combination including products from both the first and second sublots; and designating, by the processor, a highest bid of each auction in the auction combination having a highest total final bid value as a winning bid.

2. The method of claim 1, where each of the products are identical.

3. The method of claim 1, where parameters are used during the creation of each auction, the parameters storing:

a product description,
a start time,
a duration,
a lot size,
a starting price, and
a final bid.

4. The method of claim 3, where at least one of the sets of parameters includes a desired quantity, and the multiple auctions include, a first set of auctions with the lot size of each auction in the first set of auctions equal to the desired quantity, and a second set of auctions with the lot size of each auction in the second set of auctions equal to the desired quantity.

5. The method of claim 1, where at least two auctions are run over different time periods.

6. The method of claim 1, where the start time of a second auction is after a start time plus a duration of a first auction.

7. A computer-implemented method for auctioning a number of products (N), comprising:

subdividing, by a processor, the number of products (N) into a plurality of first sublots ($x_i$) and second sublots ($y_j$) of products, a total quantity of the products in the plurality of first sublots equaling the number of products $$\left(\sum_i x_i = N\right)$$

and a total quantity of the products in the plurality of second sublots equaling the number of products $$\left(\sum_j y_j = N\right);$$

creating, by the processor, an auction (A) for each sublot in the first and second sublots ($A(x_i)$ and $A(y_j)$ for all i,j);

calculating, by the processor, total final bid values (B) of a plurality of combinations (k) of the auctions, each auction combination having a total of quantity of products equaling the number of products and at least one auction combination including products from both the first and second sublots $$\left(B_k = \left(\sum_i B(A(x_i))\right) + \left(\sum_j B(A(y_j))\right)\right)$$

where i,j are selected for each k so that $$\left(\sum_i x_i\right) + \left(\sum_j y_j\right) = N); \text{ and}$$

designating, by the processor, a highest bid of each auction in the auction combination having a highest total final bid value ($\max(B_k)$ for all k) as a winning bid.

8. A system for managing multiple auctions in an auction system, comprising:

a seller-side application;
a buyer-side application;
a seller information management system;
a seller's network site; and
an auction application in communication with the seller-side application, the buyer-side application, the seller information management system and the seller's network site, the auction application configured to, subdivide, by a processor, the number of products into a plurality of first and second sublots, a total quantity of the products in the plurality of first sublots equaling the number of products and a total quantity of the products in the plurality of second sublots equaling the number of products;

create, by the processor, auctions for each sublot in the first and second sublots;

calculate, by the processor, total final bid values of a plurality of combinations of the auctions, each auction combination having a total of quantity of products equaling the number of products and at least one auction combination including products from both the first and second sublots; and designate, by the processor, a highest bid of each auction in the auction combination having a highest total final bid value as a winning bid.

9. The system of claim 8, where each of the products are identical.

10. The system of claim 8, where parameters are used to create the auctions, the parameters including a product description, a start time, a duration, a lot size, a starting price, and a final bid.

11. The system of claim 10, where the parameters include a desired quantity, and the multiple auctions include:

a first set of auctions with the lot size of each auction in the first set of auctions equal to the desired quantity, and a second set of auctions with the lot size of each auction in the second set of auctions equal to the desired quantity.

12. The system of claim 8, where a start time of a second auction is after a start time plus a duration of a first auction.

13. A computer-readable medium including instructions adapted to execute a method for managing multiple auctions in an auction system using an auction application, the method comprising:

subdividing, by a processor, the number of products into a plurality of first and second sublots, a total quantity of the products in the plurality of first sublots equaling the number of products and a total quantity of the products in the plurality of second sublots equaling the number of products;

creating, by the processor, auctions for each sublot in the first and second sublots;

calculating, by the processor, total final bid values of a plurality of combinations of the auctions, each auction combination having a total of quantity of products equaling the number of products and at least one auction combination including products from both the first and second sublots; and     designating, by the processor, a highest bid of each auction in the auction combination having a highest total final bid value as a winning bid.

14. The computer-readable medium of claim 13, where each of the products are identical.

15. The computer-readable medium of claim 13, where parameters are used to create each auction, the parameters including a product description, a start time, a duration, a lot size, a starting price, and a final bid.

16. The computer-readable medium of claim 15, where the parameters include a desired quantity, and the multiple auctions include:

a first set of auctions with the lot size of each auction in the first set of auctions equal to the desired quantity, and     a second set of auctions with the lot size of each auction in the second set of auctions equal to the desired quantity.

17. The computer-readable medium of claim 13, where a start time of a second auction is after a start time plus a duration of a first auction.

* * * * *